US008629379B2

(12) United States Patent
Senn

(10) Patent No.: US 8,629,379 B2
(45) Date of Patent: Jan. 14, 2014

(54) APPARATUS AND METHOD FOR HEATING PLASTIC PREFORMS

(75) Inventor: Konrad Senn, Regensburg (DE)

(73) Assignee: Krones AG, Neutraubling (DE)

( * ) Notice: Subject to any disclaimer, the term of this patent is extended or adjusted under 35 U.S.C. 154(b) by 141 days.

(21) Appl. No.: 13/252,391

(22) Filed: Oct. 4, 2011

(65) Prior Publication Data
US 2012/0080816 A1 Apr. 5, 2012

(30) Foreign Application Priority Data

Oct. 4, 2010 (DE) .......................... 10 2010 047 223

(51) Int. Cl.
H05B 6/64 (2006.01)
B29C 49/08 (2006.01)

(52) U.S. Cl.
USPC ............................. 219/678; 264/489; 264/138

(58) Field of Classification Search
USPC ......... 219/678, 761, 692, 679, 770, 777, 780;
264/296, 532, 138, 22, 489, 521, 490,
264/491, 530, 535, 537, 519
See application file for complete search history.

(56) References Cited

U.S. PATENT DOCUMENTS 3,830,893 A * 8/1974 Steingiser ..................... 264/489
4,795,871 A    1/1989 Strattan et al.
8,231,823 B2   7/2012 Humele et al.
2006/0151907 A1* 7/2006 Kashiwabara et al. ....... 264/138
2010/0052224 A1 3/2010 Humele et al.
2010/0181309 A1 7/2010 Senn et al.
2011/0084064 A1 4/2011 Zimmerer et al.

FOREIGN PATENT DOCUMENTS

DE  102007022386   11/2007
DE  102008024108   11/2009
DE  102009005358   7/2010
EP       2210728   7/2010
WO    2004067262   8/2004

OTHER PUBLICATIONS

German Search Report issued on Aug. 9, 2011 in corresponding German Patent Application 102010047223.9.
European Search Report dated Jul. 4, 2012, in corresponding European patent application EP 11183024.6.

* cited by examiner

Primary Examiner — Quang T Van
(74) Attorney, Agent, or Firm — Onello & Mello, LLP

(57) ABSTRACT

An apparatus for heating containers, and in particular plastic performs. At least one microwave generating unit generates an electromagnetic alternating field in the form of microwaves A microwave transfer unit transfers the microwaves generated by the microwave generating unit to a resonator unit A transport means transports the plastic preforms relative to the resonator unit. The resonator unit includes a resonator housing forming a receiving chamber for heating the plastic preforms. The resonator unit is arranged such that the electric field lines (E) of an electric field that heats the container are arranged obliquely in relation to a longitudinal direction of the container.

10 Claims, 3 Drawing Sheets

APPARATUS AND METHOD FOR HEATING PLASTIC PREFORMS

RELATED APPLICATIONS

This application claims priority under 35 U.S.C. 119 from German Patent Application No. 10 2010 047 223.9, filed Oct. 4, 2010 in the German Patent and Trademark Office.

BACKGROUND

1. Field

Embodiments of present inventive concepts relate to an apparatus and a method for heating plastic containers including, for example, plastic preforms.

2. Description of the Related Art

It is common practice during the manufacture of plastic containers to heat the containers when they are plastic preforms and to subsequently expand them into the desired shape in a moulding process such as, for example, a stretch blow moulding process. For this purpose, infrared ovens through which the plastic preforms run and in which the plastic preforms are heated, have been used. Microwave ovens have also been used, in which the plastic preforms are heated by microwaves.

Examples of a heating apparatus for plastic preforms is known from DE 10 2007 022 386 A1. The disclosure therein is herein, in its entirety, incorporated by reference. A problem in connection with the heating of plastic preforms for the stretch blow moulding process using microwaves in a cavity resonator is to heat the plastic preforms uniformly. A method is known from the above-mentioned document as well as from DE 10 1008 024 108, herein incorporated by reference in its entirety, in which an attempt is made to uniformly heat the longitudinal sides of the plastic preforms. However, problems arise here in the dome areas of such plastic preforms, i.e. at the lower ends thereof.

As a result of the behaviour of electromagnetic fields on interfaces between two different dielectrics, the electric field is markedly stronger in the areas of the transitions parallel to the electric field than they are in the areas that are perpendicular thereto.

However, since the angle of the electric field E changes due to laws of refraction, the strength of the electric field can change. As a result, E vectors which enter approximately parallel to the interface will remain approximately constant, and in the case of vectors that enter at an acute angle, the amount will abruptly decrease. Therefore, the side of the plastic preform will be heated comparatively intensely and the dome will remain cold.

In connection with this, so-called single mode cavity resonators are in some cases used. Due to their size and the frequency radiated by the magnetron, these only allow a so-called H10 mode because no other resonances can form due to the propagation laws and the interface lengths. Since the E field lines are vertical on the metal surfaces (because all non-vertical components would flow off via the metallic conductor), the field of the H10 mode is vertical between the two parallel walls of the resonator. For the interface length $\lambda c$ (below which no wave can form in the resonator), the relationship $\lambda c=2$ a applies, wherein a is the length of the broader side (e.g. of a waveguide).

This means that it is considerably more difficult to heat the plastic preform in the area of the dome, in particular around the injection point, than it is at the longitudinal sides.

One possible solution to this problem is proposed in DE 10 2007 022 386, herein incorporated by reference in its entirety, which describes a reflector element. Such a metallic reflector element can lead to distortion of the electrical field in the vicinity of the conducting surface and also to a rapid increase in case of a proper selection of geometry. This local increase can enable an improved heating of the dome region. On the other hand, such "reflector elements" also have disadvantages. Thus, for example, they may get contaminated and will therefore have to be cleaned using an additional cleaning unit such as, for example, a permanently installed brush.

SUMMARY

An aspect of inventive concepts is provided based on an object of providing an apparatus for heating plastic preforms/containers which allows the plastic preforms/containers to be uniformly heated. Advantageously, the need for the above-mentioned reflector elements could be unnecessary.

An apparatus according to embodiments of inventive concepts for heating containers including, for example, plastic preforms (which may be referred to herein interchangeably as plastic containers), comprises at least one microwave generating unit that generates an electromagnetic alternating field in the form of microwaves. In an embodiment, the apparatus also comprises a microwave transfer unit that transfers the microwaves generated by the microwave generating unit to a resonator unit. Moreover, in an embodiment, the apparatus also includes transport means for transporting the plastic preforms relative to the resonator unit, said resonator unit having a resonator housing forming a receiving chamber for heating the plastic preforms.

According to an embodiment, a resonator unit is designed such that the electric field lines of an electric field heating the container are arranged at least partly obliquely in relation to a longitudinal direction of the container. Preferably, all of the field lines are arranged or orientated obliquely relative to the longitudinal direction of the container, and the individual field lines are particularly preferably also parallel to one another. However, it would also be possible for just the directions of some of the field lines within the resonator housing to be oblique in relation to the longitudinal direction of the plastic preforms. In particular, at least some of the field lines are oblique in relation to the longitudinal direction of the plastic preform, which geometrically cross the dome area of the plastic preform during the heating process. However, it would also be possible for the directions of the individual field lines to change within the resonator.

In an embodiment, this orientation of the field lines is preferably achieved via a certain arrangement of the internal walls of the resonator housing. In an embodiment, these internal walls are arranged to be vertical to the respective field lines.

As described above, arranging the resonator in such a way that the field lines of the electric field extend parallel to a longitudinal direction of the plastic preforms can lead to particular problems in the dome area of the plastic preform.

In an embodiment, the oblique positioning or rotation of the electric field allows a more uniform heating of the plastic preforms. In other words, the electric field in the resonator is rotated relative to the longitudinal direction of the plastic preform or the preform axis. As a result of this rotation, the place with the minimum of the electric field will move to the lateral area of the dome of the plastic preform and the area with the maximum of the electric field will move to the other side.

Advantageously, in an embodiment, the apparatus includes rotating means that rotate the container at least at times during the heating thereof, in particular about the longitudinal axis thereof. If the plastic preform is now rotated, the minima and maxima of the electric field will over time superimpose and as a result the dome thereof can be uniformly heated in the course of the movement of the plastic preform, in particular also in the longitudinal direction thereof.

In an embodiment, the resonator unit is formed such that an angle between the field lines of the electric field and the longitudinal direction of the plastic containers is between 10° and 45° and, in a further embodiment, between 15° and 25°. In an embodiment, it is possible to tilt the field lines between 0° and 90. In an embodiment, to better ensure that the remaining areas of the plastic preform are heated and, in particular, the edge areas such as below the support ring of the plastic preform, an embodiment of the indicated angle range is between about 10° and 45°.

In an embodiment, the resonator housing is arranged obliquely in relation to the longitudinal direction of the plastic containers. The parallel walls of the cavity resonator can be vertical to the axis of the plastic preform and, thus, the electric field is parallel to the Z axis of the plastic preform. In an embodiment, the resonator is rotated away from this vertical position, and the electric field that is formed as a standing wave in this resonator will also be rotated. In an embodiment, the resonator housing is provided with correspondingly oblique internal walls.

In a further embodiment, the resonator housing includes a dome area, via which the microwaves are introduced into the resonator unit.

In a further embodiment, the apparatus includes a movement device that introduces the plastic container by moving it into the resonator housing along the longitudinal direction thereof or obliquely thereto.

Advantageously, the resonator housing is disposed on a movable carrier. This may for example be a circular carrier on which a plurality of such resonator housings is arranged. In this way, the plastic preforms are heated whilst being moved along a circular path.

An aspect of inventive concepts includes a method for heating plastic containers including, for example, plastic preforms. In a first step of this method, a plastic preform is introduced into a resonator housing. Subsequently, an electric field is applied to the plastic preform and by this electric field the plastic preform is heated. In this process, the electric field mentioned is generated in a microwave generating unit. Further, the plastic preform is subsequently removed from the resonator housing. According to an embodiment, at least some of the field lines of the electric field heating the container extend obliquely in relation to a longitudinal direction of the plastic preform.

In an embodiment, the plastic preforms are respectively moved relative to the resonator housing, but the reverse case of moving the resonator housing would also be possible.

In an embodiment, the plastic container is rotated relative to the longitudinal direction thereof at least at times during the application of the electric field. In an embodiment, a uniform heating including the dome area of the plastic preform can be achieved in particular by the interaction of said oblique orientation and the rotation of the plastic preform in relation to the longitudinal direction thereof. Advantageously, the plastic preform is rotated during the heating thereof essentially by a full turn or by integer multiples of a full turn.

In a further embodiment, the plastic container is introduced into the resonator housing by moving it along the longitudinal direction thereof.

BRIEF DESCRIPTION OF THE DRAWINGS

The accompanying drawings are included to provide a further understanding of the present inventive concepts, and are incorporated in, and constitute a part of, this specification. The drawings illustrate exemplary embodiments of the inventive concepts and, together with the description, serve to explain principles of the inventive concepts. In the drawings.

DETAILED DESCRIPTION OF EMBODIMENTS

Embodiments of present inventive concepts will now be described more fully hereinafter with reference to the accompanying drawings, in which embodiments of the inventive concepts are shown. The inventive concepts may, however, be embodied in different forms and should not be construed as limited to the embodiments set forth herein. Like numbers refer to like elements throughout the specification.

It will be understood that, although the terms "first", "second", etc. are used herein to describe various elements, these elements should not be limited by these terms. These terms are used to distinguish one element from another. For example, a "first" element could be termed a "second" element, and, similarly, a "second" element could be termed a "first" element, without departing from the scope of the present inventive concepts. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
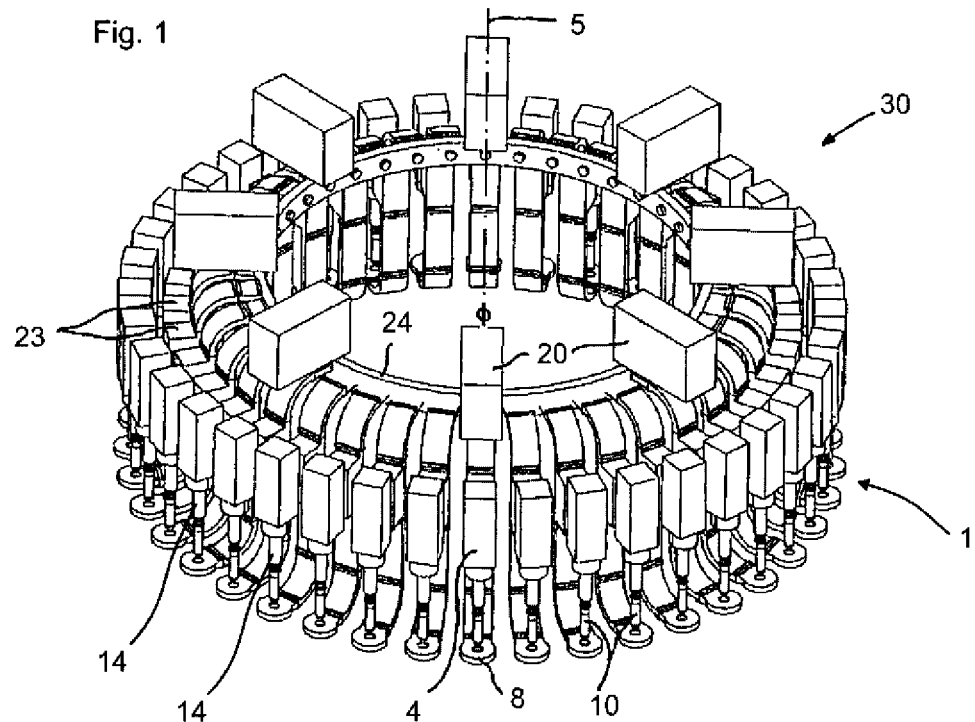
FIG. 1 shows a perspective view of a heating apparatus.

FIG. 1 shows a heating apparatus 1 for preforms 10, which is arranged here to be circular, and these preforms are moved in the course of the heating process according to the circumference of the heating apparatus along a circular path by means of a carrier 24. The carrier 24 constitutes here at the same time a square waveguide and forms part of a transport unit generally identified with 4. On this carrier, a plurality of microwave generating units 20 or microwave compact heads 20 is provided. Moreover, the apparatus 1 also includes microwave heating units 30 which also circulate in relation to a machine axis 5.

Reference numeral 8 refers to a resonator housing into which the plastic preforms 10 are inserted. Reference numeral 14 refers to transport means that move the plastic preforms, for example along their longitudinal axis L relative to the resonator housings 8.

Figure 2:
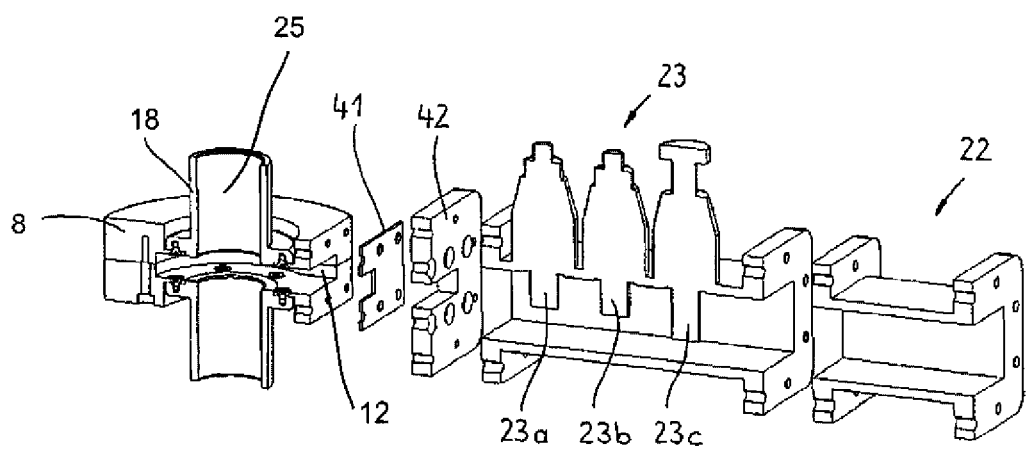
FIG. 2 shows a further detailed view of a section of the heating apparatus of FIG. 1.

FIG. 2 shows a further detailed view of a section of the heating apparatus of FIG. 1. For this embodiment, three tuning pins 23*a*, 23*b* and 23*c* are provided next to a waveguide 22, which tuning pins together form a tuning unit 23 for tuning microwave power. Reference numeral 42 identifies a fastening element and reference numeral 41 an aperture used for introducing the microwaves into the resonator housing 8. Reference numeral 25 identifies a receiving chamber used for heating the plastic preforms (not shown). Reference numeral 18 relates to a longitudinal section of the receiving chamber 25. Reference numeral 12 relates to a coupling-in area via which the microwaves are coupled into the resonator unit 6.

Figure 3:
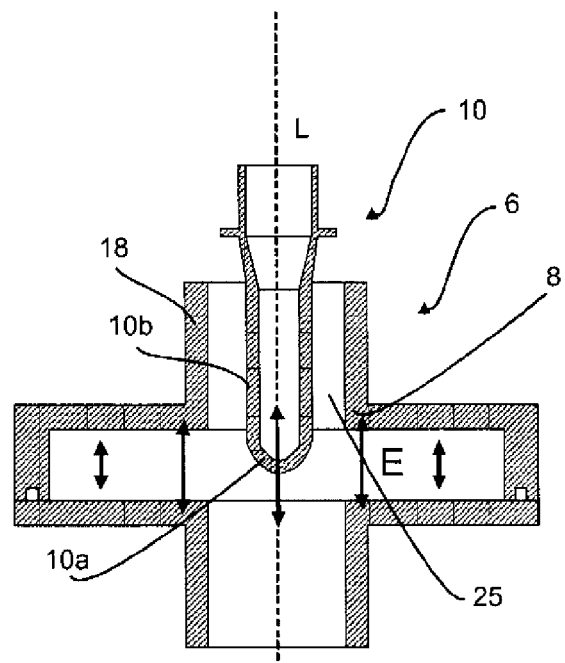
FIG. 3 shows a view of a resonator.

FIG. 3 shows a sectional view of a resonator housing 6. It can be seen that the plastic preform 10 can here be introduced into the housing along the longitudinal direction L thereof. The electric field E within the resonator is here considerably weakened in the area of the dome 10*a* of the plastic preform and therefore only weakly heats the plastic preform in this dome area. As a result, any stretching of the material during the subsequent blow moulding process will be reduced to a minimum in this weakly heated area.

Figure 4:
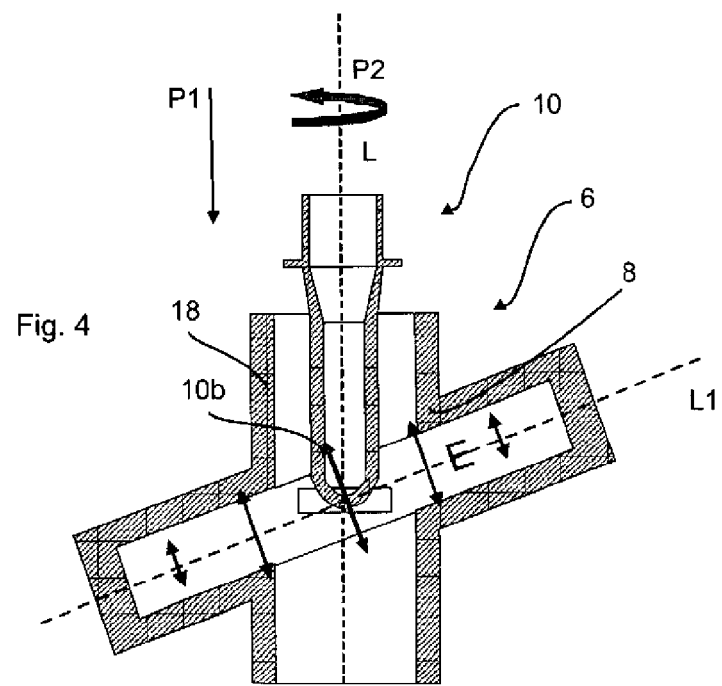
FIG. 4 shows a view of a resonator according to an embodiment of inventive concepts.

FIG. 4 shows a sectional view of a resonator 6 according to an embodiment of present inventive concepts. It can be seen that the resonator housing 8 is arranged here obliquely in relation to the longitudinal direction L of the plastic preform. More specifically, a longitudinal direction L1 of the resonator housing 8 extends at an angle relative to the longitudinal direction L of the plastic preform and is not vertical thereto. As a result, also the field lines E of the electric field generated in the resonator housing do not extend in the longitudinal direction of the plastic preform, but obliquely relative thereto. In this way, as will be explained in more detail below, also the dome area 10*a* of the plastic preform will be heated more efficiently. The plastic preform is introduced into the resonator housing along the direction P1 and is removed from the resonator housing 8 in the opposite direction to P1. Reference sign P2 indicates the rotation of the plastic preform in relation to the longitudinal axis thereof.

Figure 5A:
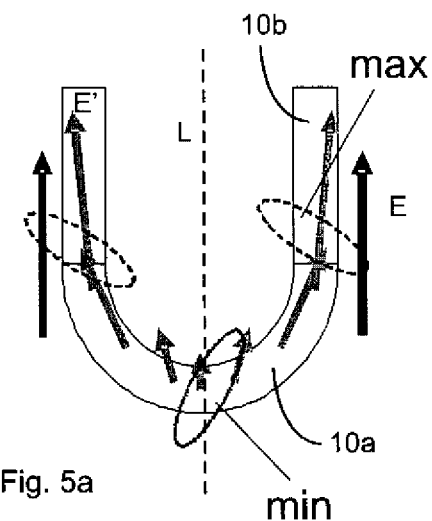
FIGS. 5a, 5b show two comparative views for illustrating the field distribution in a plastic preform according to embodiments of inventive concepts.
Figure 5B:
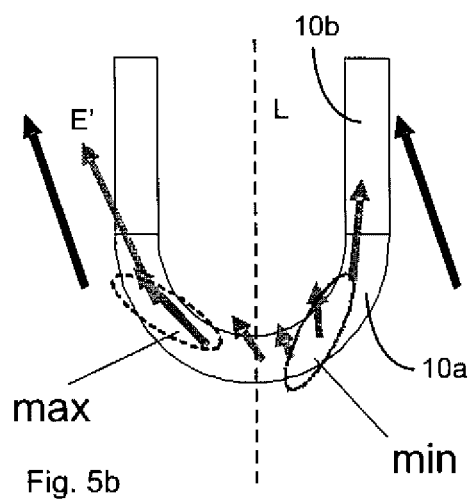

FIGS. 5*a*, 5*b* show two comparative views for illustrating the field distribution in a plastic preform according to embodiments of inventive concepts. In the view shown in FIG. 5*a*, the field lines of the electric field extend parallel to the longitudinal direction L of the plastic preform. This means that in the areas 10*b* of the plastic preform, a strong electric field (indicated by the long arrows) occurs which leads to an increased heating of the plastic preform. By contrast, in the dome area only a reduced or minimal heating of the plastic preform occurs because the electric field is severely weakened here.

In the view shown in FIG. 5*b*, however, the electric field E is oriented obliquely in relation to the longitudinal direction of the plastic preform according to an embodiment of inventive concepts. In this case, the electric field is stronger in the area designated "max" and is weaker in the area designated "min", i.e. the area of minimum field strength is offset in relation to the longitudinal direction L of the plastic preform.

If the plastic preform is now rotated about its longitudinal axis L, a uniform heating of the dome area 10*a* of the plastic preform occurs. Moreover, in an embodiment a plastic preform is rotated about an axis that is parallel to the longitudinal direction of the plastic preform, i.e. to carry out an eccentric rotation of the plastic preform. In an embodiment, the plastic preform is rotated about an axis that is oblique in relation to the longitudinal direction thereof. However, also in this case the result would be that the electric field E is at least at times oblique in relation to the axis of rotation of the plastic preform.

Figure 6A:
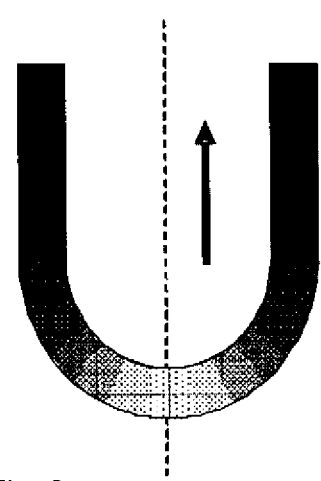
FIGS. 6a, 6b show two further comparative views of the heating of plastic preforms according to an embodiment of inventive concepts.
Figure 6B:
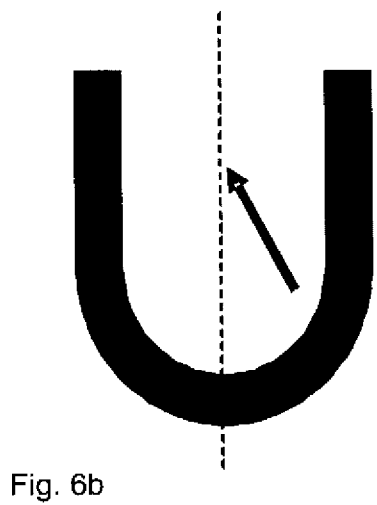

FIGS. 6*a*, 6*b* show two further comparative views of the heating of plastic preforms according to an embodiment of inventive concepts. As is illustrated in FIGS. 6*a* and 6*b*, a uniform heating of all the areas of the plastic preforms is carried out by a procedure according to embodiments of inventive concepts.

However, in an embodiment, it is possible to use for this purpose the oblique electric field relative to the longitudinal direction in order to deliberately heat different areas of the plastic preform with different intensities. This could, for example, be carried out also by rotating the plastic preform not about its longitudinal direction but about an axis that is parallel thereto but laterally offset. In an embodiment, it is also possible to deliberately rotate the plastic preform during the heating process not by a full turn, but for example by one and a half turns or by half a turn and the like. In this case, it could for example be achieved that the external wall of the plastic preform is heated stronger in certain areas and weaker in other areas. In a subsequent moulding process, containers having a non-circular cross section, e.g. oval containers, could be produced in this way.

In a further embodiment, the plastic preform is rotated during the heating thereof not continuously at the same speed, but stepwise or with changing speeds of rotation. In this way, certain areas of the perimeter wall can be heated stronger than other areas, so that during the expansion thereof again a non-circular container can be blow moulded.

While the inventive concepts have been particularly shown and described with reference to exemplary embodiments thereof, it will be understood by those of ordinary skill in the art that various changes in form and details may be made therein without departing from the spirit and scope of the inventive concepts as defined by the following claims. Therefore, the disclosed subject matter is to be considered illustrative and not restrictive.

What is claimed is:

1. An apparatus for heating plastic containers, comprising:
at least one microwave generating unit that generates an electromagnetic alternating field in the form of microwaves for heating the plastic containers;
a resonator unit having a resonator housing that forms a receiving chamber within which the plastic containers can be heated;
a microwave transfer unit that transfers the microwaves generated by the microwave generating unit to the resonator unit; and
a transport unit that transports the plastic containers to the receiving chamber of the resonator unit;
wherein the resonator housing is arranged obliquely in relation to the longitudinal direction of the plastic containers, and wherein the resonator unit is arranged such that at least some of the electric field lines of an electric field that heats the container are arranged obliquely in relation to a longitudinal direction of the container.

2. The apparatus as claimed in claim 1,
wherein the apparatus includes a rotation unit that is configured to rotate the container at least at times during the heating of the container about the longitudinal axis of the container.

3. The apparatus as claimed in claim 1,
wherein the resonator unit is arranged such that an angle between the field lines and the longitudinal direction of the plastic containers is between about 10° and 45°.

4. The apparatus as claimed in claim 1, wherein the resonator unit is arranged such that an angle between the field lines and the longitudinal direction of the plastic containers is between about 15° and 25°.

5. The apparatus as claimed in claim 1,
wherein the resonator housing has a coupling-in area through which the microwaves are introduced into the resonator unit.

6. The apparatus as claimed in claim 1,
wherein the apparatus has a movement device that introduces the plastic container into the resonator housing by moving it along the longitudinal direction of the plastic container.

7. The apparatus as claimed in claim 1,
wherein the resonator housing is disposed on a movable carrier.

8. A method for heating plastic containers, the method comprising:
introducing a plastic container into a resonator housing that is arranged obliquely in relation to a longitudinal direction of the plastic container;
applying an electric field onto the plastic container and heating the plastic container using said electric field;
removing the plastic container from the resonator housing;
wherein at least some of the field lines of the electric field heating the container extend obliquely in relation to the longitudinal direction of the plastic container.

9. The method as claimed in claim 8,
wherein the plastic container is rotated at least at times during the application of the electric field in relation to the longitudinal direction thereof.

10. The method as claimed in claim 8,
wherein the plastic container is introduced into the resonator housing by moving it along the longitudinal direction of the plastic container.

* * * * *